United States Patent [19]
Markley

[11] 3,746,175
[45] July 17, 1973

[54] COMPACT DIALYZER
[75] Inventor: Finley W. Markley, Naperville, Ill.
[73] Assignee: The United States of America as represented by the United States Atomic Energy Commission, Washington, D.C.
[22] Filed: Sept. 14, 1971
[21] Appl. No.: 180,345

[52] U.S. Cl. .............................. 210/321, 210/500
[51] Int. Cl. ............................................ B01d 31/00
[58] Field of Search ...................... 55/158; 210/321, 210/500

[56] References Cited
UNITED STATES PATENTS
3,342,729   9/1967   Strand ............................ 210/500 X
3,557,962   1/1971   Kohl ............................... 210/500 X
2,982,416   5/1961   Bell ..................................... 210/321

Primary Examiner—Frank A. Spear, Jr.
Attorney—Roland A. Anderson

[57] ABSTRACT

A compact dialyzer has capillary tubes orderly arranged in layers to provide a large surface area for dialysis in a small volume. Each layer of capillary tubes consists of a single row of parallel tubes whose axes are angularly disposed to the axes of the tubes in each of the two adjacent layers. The axes of the tubes of alternate layers are parallel. The dialyzer is manifolded such that a first-fluid passes through all the capillary tubes while a second-fluid passes over the capillary tubes between the layers. The capillary tubes can be channels defined between the peaks of a top pleated sheet of a semipermeable membrane and a bottom flat sheet of the semipermeable membrane to which the pleated sheet has been bonded.

17 Claims, 9 Drawing Figures

Inventor
Finley W. Markley
Attorney

Inventor
Finley W. Markley
Attorney

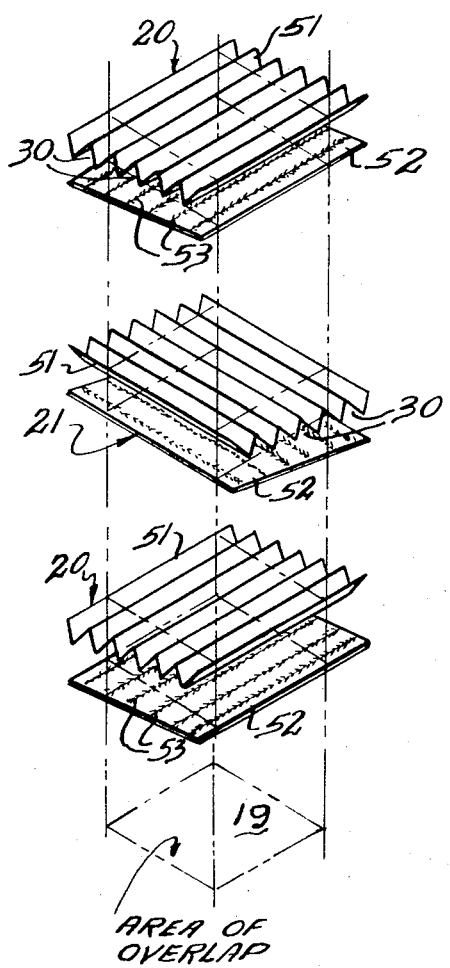
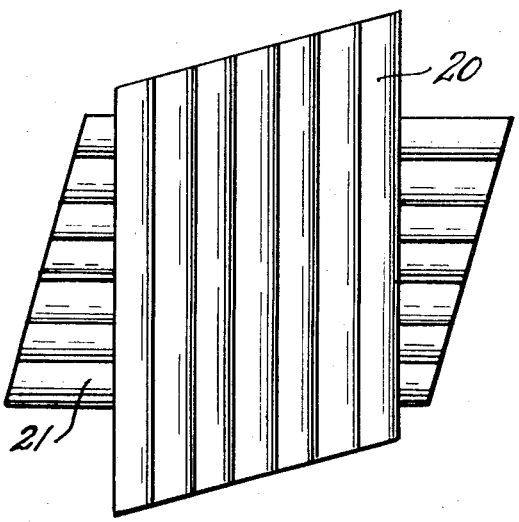
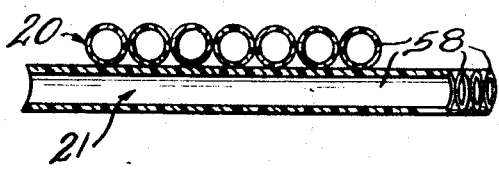
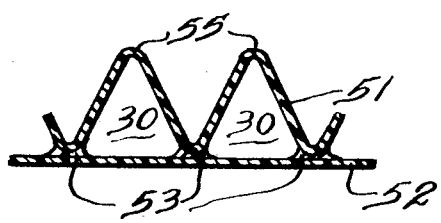

COMPACT DIALYZER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The invention relates generally to an apparatus for the dialysis of a fluid, dialysis being herein defined broadly as a process in which substances present in a first fluid which is in contact with a second fluid across a semipermeable membrane are transferred from the first fluid to the second fluid through the semipermeable membrane or are restrained from such transfer while the first fluid itself permeates through the membrane. More particularly, the invention relates to an apparatus which is capable of being used for a number of processes included in the above definition of dialysis wherein a large active surface area to volume ratio is desired such as a lung device or oxygenator for the exchange of oxygen and carbon dioxide across a membrane, a reverse osmosis device for the purification or desalination of water, or a hemodialysis device for purification of blood. In more detail, the invention relates to an apparatus for removal of impurities and excess water from blood by extra-corporeal hemodialysis wherein a very large surface area available for dialysis is provided in a compact unit which has a small blood priming volume and which unit can be used in the home and discarded after use.

Application of the well-known and studied phenomenon and concept of dialysis to the purification of blood by hemodialysis in an artificial kidney machine has been proven and practiced for many years. The purification of the blood results from a concentration gradient established across a semipermeable membrane which forces impurities which are at a higher concentration in the blood to permeate through the membrane from the blood into a dialyzing fluid, hereafter referred to as the dialysate, at a faster rate than they permeate the opposite direction, thereby resulting in a net transfer of impurities from the blood. The pores of the semipermeable membrane are of such a size that while the smaller molecules of the impurities readily pass through the pores, the blood cells and proteins in the blood are much too large to so pass. Since some components and substances, such as sugar and various salts, which are vital parts of the blood are small enough to pass through the pores, the dialysate contains these substances at a concentration equivalent to that in the blood in order to prevent their loss from the blood by dialysis. Excess water is similarly removed from the blood by the process of ultrafiltration wherein a pressure differential is established across the membrane with the blood at a slightly higher pressure than the dialysate, this pressure difference driving water from the blood through the pores of the semipermeable membrane. This pressure difference also serves to prevent contamination of the blood by the dialysate should a leak develop in the membrane or associated apparatus.

The application of the principles of hemodialysis to human patients became possible with the discovery that tubes of regenerated cellulose could be used for the semipermeable membranes. Earlier hemodialyzers, which are still used today, consisted of a coil of a long length of regenerated cellulose tubing submerged in a bath of the dialysate. Improvements and modifications in the hemodialyzers included flattening the tubes to somewhat reduce the volume of blood necessary to fill the tubing and prime the unit, using many short lengths of tubing in parallel instead of a few long lengths, and forming parallel tubes by pinching two sheets of regenerated cellulose between two grooved boards. However, all of these hemodialyzers suffer from one or more disadvantages in that they need a large supply of blood to prime the large volume of tubing, they need an external blood pump to push the blood through the tubing, they require reconstruction and sterilization of the apparatus after each use, or they require the presence of trained technicians and medical personnel to supervise the hemodialysis treatment. Due to the large volume of these dialyzers a blood transfusion is often required and the large priming volume itself results in an expensive and somewhat wasteful use of blood. Since proper equipment and medical personnel are not widely available, hemodialysis is most frequently conducted in a hospital.

Although the number of people suffering from chronic kidney disease or kidney failure in this country alone is very high, the number of people able to obtain proper medical treatment is tragically low. This is due both to the limited and vastly inadequate number of artificial kidney machines actually available and to the overbearing expenses involved in receiving such treatment, the costs being in the range of $20,000–$25,000 per year for in-hospital treatment and a minimum of about $5,000 even if the treatments are conducted in the patient's home, this $5,000 not taking into consideration the labor on the part of the patient or assistance from the patient's family. Consequently, more recent development efforts in artificial kidney machines have been directed toward reducing the blood volume required for operation of the unit without lowering its efficiency, eliminating the need for an external blood pump, and increasing the availability of proper medical care for kidney patients both by increasing the actual number of artificial kidney machines and by lowering the necessary costs of continuing hemodialysis treatments. Among the new developments in this area is the Argonne Dialyzer, developed by the present applicant, Finley W. Markley, and Ardis R. Lavender, which is the subject of U. S. Pat. No. 3,522,885 and U. S. Pat. No. 3,565,258. The Argonne Dialyzer is a small hemodialyzer which has many parallel tubes of regenerated cellulose bonded together with an epoxy resin and contained within a plastic case. Supports are disposed between or within the flattened parallel tubes. This dialyzer is sufficiently small that no transfusion or extra blood for priming the unit is necessary and the need for a blood pump has been eliminated.

However, the presently available hemodialyzers do not completely solve all the problems faced by kidney patients. It remains most desirable to increase the availability of hemodialysis treatment by increasing the availability of hemodialyzers both numerically and economically. To these ends, it is desirable to provide a hemodialyzer unit which can be more easily produced in large numbers and produced at relatively low costs and which can be used without the need of elaborate associated safety equipment and pumps and without the need of hospitalization or supervision by trained technicians or medical personnel.

Similarly, it still remains desirable to further reduce the blood priming volume by decreasing the size of the dialyzer unit while at the same time increasing the efficiency of the dialyzer unit by increasing the surface area of the membrane-interface between the blood and the dialysate. surface area surface available for dialysis in a given volume can be greatly increased by the use of many more tubes of smaller diameter, use of capillary size tubes, of course, yielding the greatest surface area in a relatively small volume. However, the use of capillary tubes presents two basic problems which prior to the present invention could be overcome only with great difficulty or could not be overcome at all. First was the difficult problem of manifolding the ends of all the tubes such that there were no leaks, and second was the problem that no way was known to arrange the capillary tubes in an orderly geometric array to significantly reduce the volume occupied by the capillary tubes, the random disarray of tubes occupying such a comparatively large volume that little would be gained in the surface-area to volume ratio by using capillary tubes.

One of the future goals of dialysis research is a wearable continuously functioning dialyzer which needs to be replaced only periodically. A patient would wear this device while going about his normal business and merely replace the dialyzer cartridge each week or perhaps each month. A patient would then not be required to submit to periodic intervals of relative inactivity while undergoing dialysis treatment, and the patient would very likely be healthier because the continuously functioning dialyzer would prevent a buildup of poisons in the blood. Such a wearable continuously functioning dialyzer will be possible only with developments in three areas. First, a method of preventing clotting of the blood in the dialyzer must be perfected. The fibrinogen of the blood is affected by the presently used membranes so that it is deposited from the blood onto the membrane surfaces, and a buildup of fibrinogen on the membrane can result in clotting of the blood in the dialyzer. Under present practices, an antithrombogenic drug is injected into the patient before he undergoes the dialysis treatment to prevent clotting in the dialyzer. Use of an injected antithrombogenic drug is not satisfactory for a wearable continuously functioning dialyzer because the presence of the drug in the patient's system would also prevent clotting of the blood if the patient were accidentally cut. Studies are presently being conducted into an antithrombogenic surface treatment for the membranes so that the surfaces will not interact with the blood and there will be no problem of clotting in the dialyzer, while at the same time there will be no antithrombogenic drug present in the blood stream to prevent clotting of an accidental cut. Second, a method of purifying the dialysate must be found so that only a small amount of dialysate fluid is required, the dialysate being continuously purified and recirculated through the dialyzer. Presently there is no practical way to purify the dialysate and hence a large volume of dialysate is required to be passed once through the dialyzer. Since it is not feasible to have a wearable dialyzer if a large volume of dialysate is required, a means for purifying the dialysate is needed so only a small volume which is recirculated can be used. Third, a dialyzer unit must be developed which has a large enough surface area for efficient dialysis in a small enough volume that the unit can be worn by the patient while performing substantially normal activities. While research is continuing for solutions to the first two problems, it is felt that the present invention provides sufficient surface area in a small enough volume so that it is capable of being adapted to use as a wearable continuously functioning dialyzer.

Accordingly, it is an object of the present invention to provide an apparatus for the dialysis of a fluid in which a very large semipermeable membrane surface area is contained in a compact unit having a relatively small internal volume. Particularly, it is intended to provide such a dialyzer which can be used in the hemodialysis treatment of human patients suffering from chronic kidney disease or kidney failure so that only a very small volume of blood is required to prime the unit. It is also intended to provide a dialyzer which has a very large surface area in a small enough total volume that the dialyzer could be adapted for use as a wearable continuously functioning hemodialyzer if or when the other problems attending such a device are solved.

It is another object of the present invention to provide a dialyzer unit which can be used by the patient in his home without requiring the presence of trained technicians or medical personnel. Moreover, it is desired to provide a hemodialyzer which can be relatively inexpensively produced and which can be more easily produced in large numbers. In correlation with this is the object to provide a hemodialyzer which can be produced in sufficient numbers and at a sufficiently low cost that each unit may be discarded after use.

SUMMARY OF THE INVENTION

A compact dialyzer according to the present invention has a small blood priming volume while providing a very large surface area for dialysis. A large surface area available for dialysis in a small total volume is made possible by use of semipermeable membranes in the form of capillary tubes which are orderly arranged, the tubes being arranged in layers, each layer being a single row of parallel tubes. The tubes and layers are further arranged so that the axes of the tubes of any one given layer are at an angle to the axes of the tubes in each of the two adjacent layers and so that the axes of the tubes in alternate layers are parallel. Since the axes of the tubes in all odd layers are parallel and the axes of the tubes in all even layers are parallel while the axes of the tubes in odd layers are at an angle to the axes of the tubes in even layers, the ends of the capillary tubes can be manifolded so that one fluid flows through the capillary tubes while a second fluid flows over the tubes between the layers.

Another novel aspect of the invention is that channels defined between the peaks of a top pleated sheet of the semipermeable membrane and a bottom flat sheet of the semipermeable membrane to which the pleated sheet has been bonded serve as the capillary tubes. Other shapes of tubes including round capillary fibers may also be used.

BRIEF DESCRIPTION OF THE DRAWINGS

Advantages of the present invention will become apparent upon reading the following detailed description of the invention and reference to the drawings, in which:

FIG. 5 is an exploded view showing the arrangement of the capillary tubes in greater detail.

FIG. 6 is an enlarged cross-sectional view of capillary tube channels made in accordance with the present invention.

FIG. 7 is a sketch showing the angular relationship of the parallel tubes of one layer to the parallel tubes of an adjacent layer.

FIG. 8 is a vertical cross section showing an alternative construction of the capillary tubes as being round capillary fibers.

DESCRIPTION OF THE PREFERRED EMBODIMENT OF THE INVENTION

While the invention is here described in connection with a preferred embodiment, it will be understood that it is not intended to limit the invention to only that specific embodiment, but it is intended to cover all alternatives, modifications and equivalents as may be included within the spirit and scope of the invention as defined by the appended claims.

Figure 3:
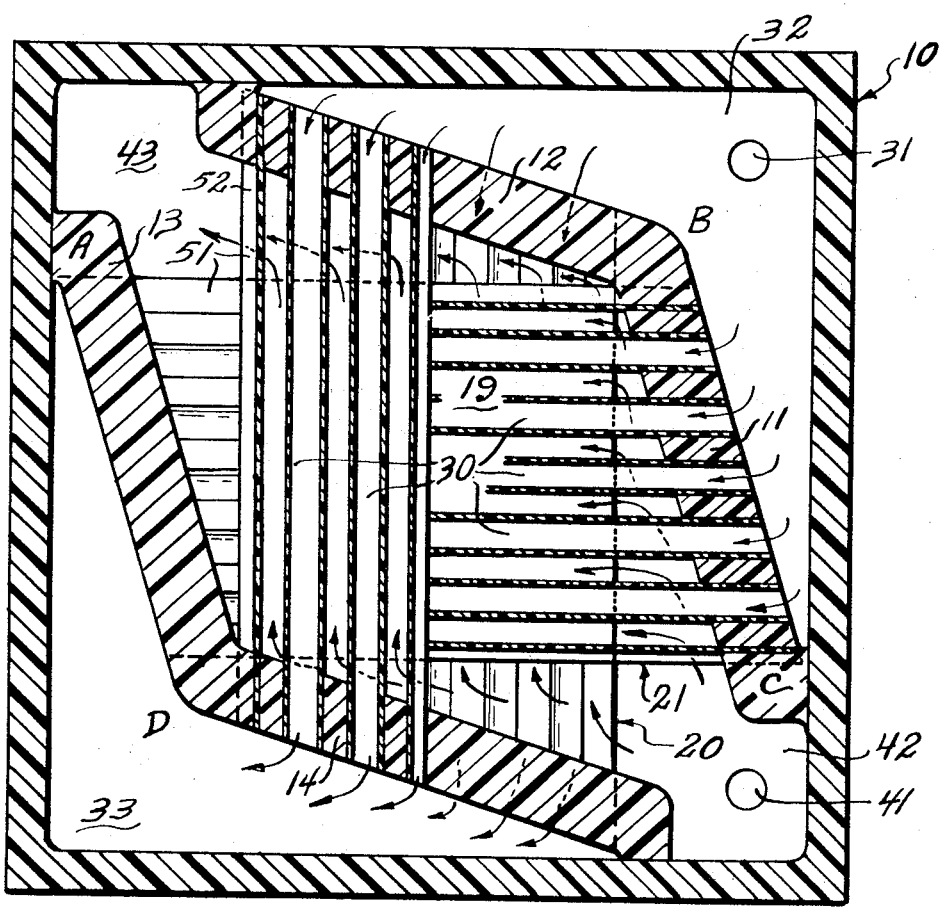
FIG. 3 is a horizontal section taken along the line 3—3 of FIG. 2 at two different elevations.

According to the present invention, semipermeable membrane tubes are arranged in stacked layers consisting of a single row of parallel tubes. Since an understanding of this arrangement of the tubes is necessary for a clear understanding of the operation and construction of the invention as well as being beneficial to understanding the description of the invention as a whole, the layered arrangement of the tubes is first briefly described. Referring to FIG. 3 for a general description of the arrangement of the tubes, a plurality of layers 20 of parallel tubes 30 are angularly disposed with respect to a plurality of layers 21 of identical parallel tubes 30. In this figure a single layer 21 and two layers 20, one above and one beneath the layer 21, are shown. Although no significance attaches to labeling any one particular layer odd or even, in order to facilitate the description of the invention, the layers 20 will be considered even layers and, correspondingly, the layers 21 will be odd layers. The layers are stacked one upon another with the axes of the tubes 30 of all even layers 20 being parallel and the axes of the tubes 30 of all odd layers 21 being parallel, the axes of the tubes 30 in any one layer lying in a single row. Looking at the one shown layer 21 individually as an example of all layers, it can be readily seen that, in the preferred embodiment of the invention, the tubes 30 of layer 21 define a parallelogram ABCD having adjacent sides of unequal length with the axes of the tubes 30 parallel to the longer sides AB and CD of parallelogram ABCD. The layers 20 and the layers 21 are stacked such that the planes of all the parallelograms are parallel. The parallelograms of alternate layers, such as the two shown layers 20, are identical in size and shape and the tubes in these alternate layers are parallel, whereas the parallelograms of odd layers 21 are mirror images of the parallelograms of even layers 20 and the tubes in odd layers 21 are angularly disposed to the tubes in the adjacent even layers 20. That an even layer and odd layer parallelogram are the mirror image of each other is perhaps most clearly seen in FIG. 7 where an even layer 20 and the adjacent odd layer 21 are pictured, divorced of all other structure. It can be seen in FIG. 3 that the even layers 20 overlap the odd layers 21, the layers being stacked such that all layers overlap in the same area, this area of overlap coinciding throughout the stack of layers as is depicted more clearly in the exploded view of FIG. 5. A dialysis chamber 19 extends through the stack within this area. Since the dialysis chamber 19 is coextensive with the area of overlap extended through the stack of layers, all tubes 30 necessarily pass through the dialysis chamber. It should be noted that the dialysis process is not limited to the dialysis chamber 19, but will also take place in areas in addition to the area where all tubes overlap, as will be discussed below.

Figure 1:
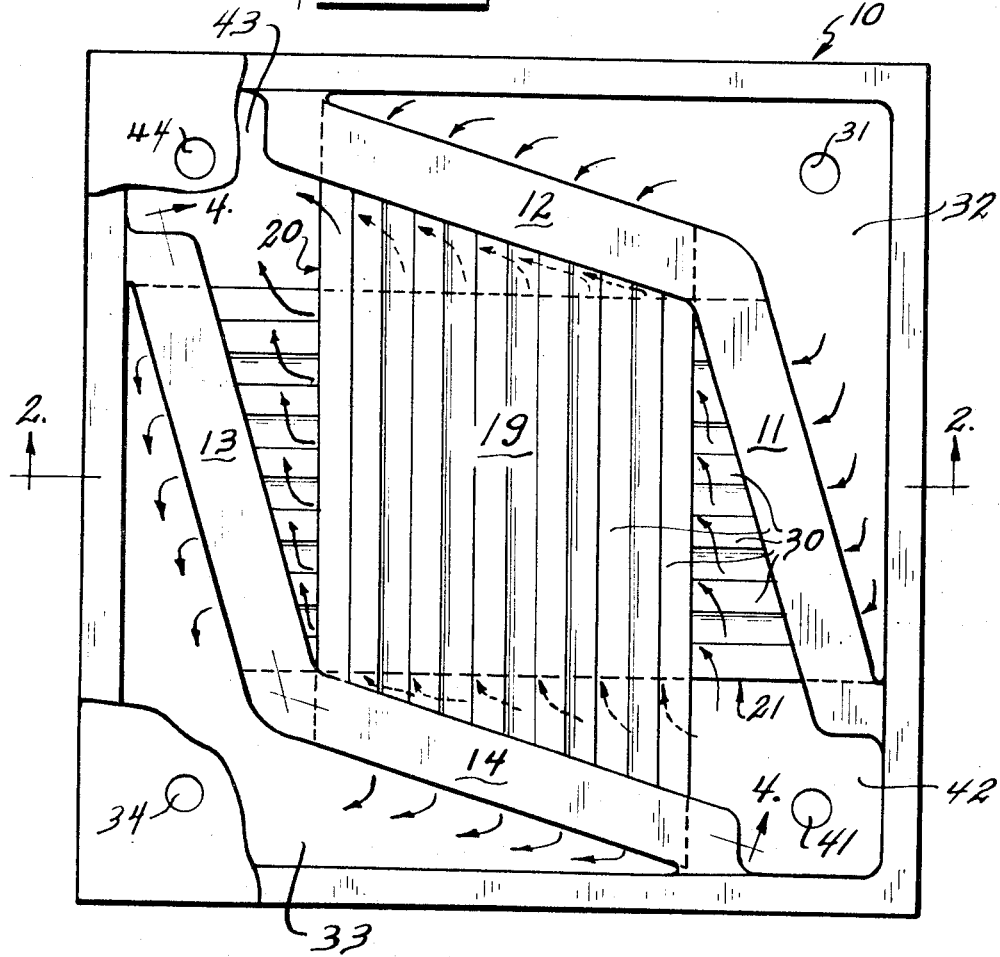
FIG. 1 is a top view of a dialyzer made in accordance with the preferred embodiment of the present invention with the cover largely broken away.
Figure 4:
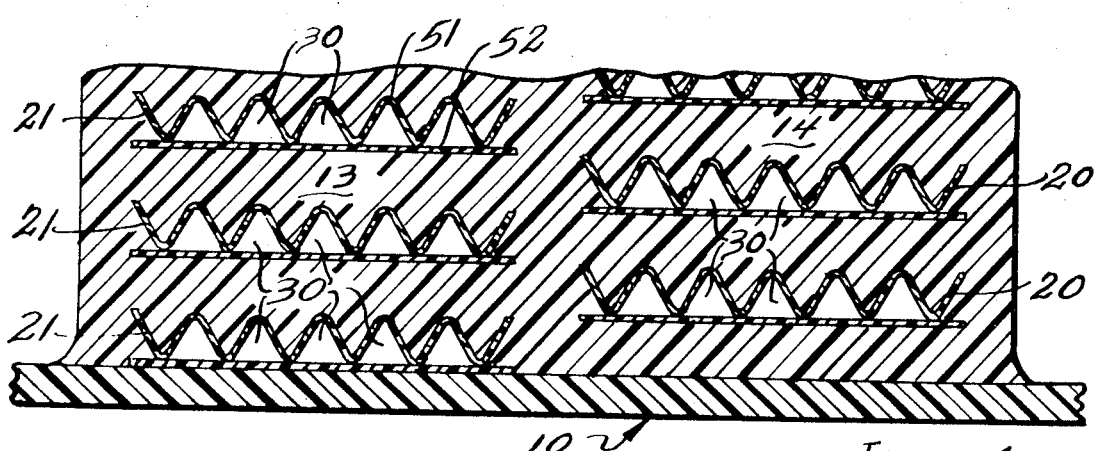
FIG. 4 is a vertical section taken along the angular line 4—4 of FIG. 1 showing the layers of tubes and the manner in which the ends of the tubes of the different layers are sealed together.
Figure 2:
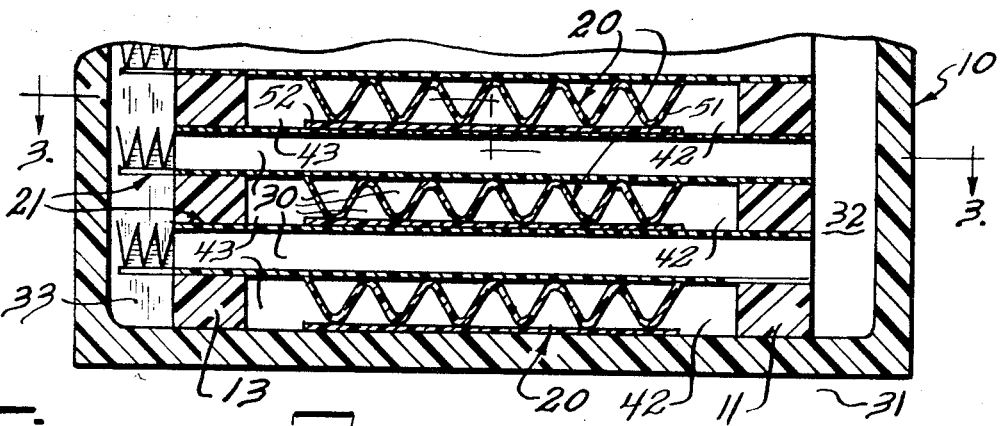
FIG. 2 is a vertical section taken along the line 2—2 of FIG. 1.

Having briefly described the stacked layered arrangement of the tubes, a description of the entire invention is now presented. Turning now to FIG. 1, the dialyzer includes a housing 10, enclosing the capillary tubes 30 arranged in layers 20 and 21 as described above. The tubes of the even layers are sealed together at each of the ends to form effectively a first even layer tube sheet 12 at one end and a second even layer tube sheet 14 at the opposite end, the tubes of the odd layers being likewise sealed together at each of the ends, forming effectively a first odd layer tube sheet 11 and a second odd layer tube sheet 13. The manner in which the tubes are sealed together to form the tube sheets is best shown in FIG. 4 wherein the tubes 30 of the odd layers 21 are sealed together to form the tube sheet 13 and the tubes 30 of even layers 20 are sealed together to form tube sheet 14. One edge of the first even layer tube sheet 12 is sealed at an obtuse angle to an edge of the first odd layer tube sheet 11, the opposite edges of these two tube sheets being sealed to the housing 10. The second even layer tube sheet 14 is likewise sealed to the second odd layer tube sheet 13 at an obtuse angle with the opposite edges of each of these tube sheets being similarly sealed to the housing 10, the tube sheets thereby forming walls with openings for the tubes as pictured in FIG. 4. Referring again primarily to FIG. 1, there is shown an inlet 41 for a first-fluid located on one end of the housing and an outlet 44 located on the opposite end of the housing. The inlet 41 leads to a distribution manifold 42 which is defined by the interior face of tube sheet 14, the housing 10, and the interior face of tube sheet 11 and which fronts on the dialysis chamber 19. The outlet 44 leads from a collection manifold 43 which lies between the interior face of tube sheet 13, the housing 10, and the interior face of tube sheet 12 and which similarly fronts on the opposite sides of the dialysis chamber 19 from the distribution manifold 42, the manifolds 42 and 43 communicating only through the dialysis chamber 19. An inlet 31 for a second-fluid is located on the opposite end of the housing from a second-fluid outlet 34. The inlet 31 leads to a distribution manifold 32 which lies between the exterior faces of the tube sheets 11 and 12 and two adjacent sides of the housing 10. The outlet 34 leads from a collection manifold for the second-fluid 33 which lies between the exterior faces of the tube sheets 13 and 14 and the other two adjacent sides of the housing 10. The second-fluid manifolds 32 and 33 communicate only through the tubes 30 as best shown in FIGS. 2 and 3, and are sealed from the first-fluid manifolds 42 and 43 as well as the dialysis chamber 19.

Further in accordance with the preferred embodiment of the present invention, the semipermeable membrane tubes consist of the channels between the peaks of a top pleated sheet and a bottom flat sheet of the membrane to which the top pleated sheet has been bonded. Referring to FIGS. 5 and 6 for illustration of capillary tubes so formed, there is shown in FIG. 5 a layer 20 of capillary tubes 30 formed by a top pleated sheet 51 and a bottom flat sheet 52 of the semipermeable membrane. The top pleated sheet 51 has been bonded to the bottom flat sheet 52 by an epoxy resin adhesive 53. The nature of the tubes so formed is better pictured in FIG. 6 wherein the enlarged cross-sectional view of the tubes shows the top pleated sheet 51 bonded by epoxy resin 53 to the bottom flat sheet 52. The channels of the tubes 30 can clearly be seen lying between the peaks 55 of the pleats and the flat sheet 52. While the figures depict and applicant prefers triangular pleats, the invention is not so limited and the pleats may be of any desired shape such as, but not limited to, squares, semicircles, etc. The invention should likewise not be limited to a flat bottom sheet as in fact two sheets of pleated semicircles could be bonded at appropriate points to yield a sheet of circular tubes. However, for reasons discussed below, the applicant has preferred the use of triangular pleats. Similarly, the invention should not be limited to tubes formed by bonding two sheets of the membrane together since, as illustrated in FIG. 8, normal round capillary fibers 58 can be used equally well.

In the preferred embodiment of the invention, the housing enclosing the stack of layers of tubes is rectangular along the height of the stack and square in cross section. This shape for the housing, rectangular parallelepiped with a square cross section, is preferred both because a housing of this shape is easily constructed and because the desirable wedge-shaped manifolds are easily constructed in a housing of this shape. However, the invention should not be limited to this specific shape for the housing as in fact many other shapes are quite readily adaptable to the invention.

The operation of the present invention in accordance with the preferred embodiment is best illustrated by reference to FIG. 3, where it can be seen that one fluid passes through the inlet and fills the distribution manifold 32. Since this fluid has access to the open ends of the tubes 30 which extend through the tube sheets 11 and 12, the fluid passes through the dialysis chamber in tubes 30 in the direction of the arrows in FIG. 3 exiting from the openings in the opposite ends of the tubes which extend through tube sheets 13 and 14 into the collection manifold 33 from which the fluid exits through the outlet.

Another fluid enters through the inlet into distribution manifold 42 and flows in the distribution manifold laterally from the point of entrance over the layers of tubes in the space afforded between the alternate layers as shown by the arrows. The fluid then flows through the dialysis chamber 19 over and around the tubes 30 between the layers to the collection manifold 43. The fluid then passes laterally over the layers of tubes in the space afforded between alternate layers to the point of exit where it passes from the collection manifold 43 through the outlet.

Since both fluids pass through the dialysis chamber, one within the tubes and the other over and around the tubes, active dialysis takes place as the fluids so pass. In the preferred embodiment, dialysis will also occur in that portion of the manifolds 42 and 43 through which the tubes extend as the fluid flowing in the manifolds is passing across the tubes between the alternate layers.

The efficiency of a dialyzer unit is dependent upon many variables. One of these is the relative direction of flow of the two fluids, i.e. whether they are in a co-current, cross-current, or counter-current flow, counter-current flow between the blood and the dialysate being the most desirable relation. Referring to a dialyzer for the purification of blood, for an example, in a co-current flow situation, the blood and dialysate first come into contact across the membrane at a point where neither has been involved in any active dialysis. At this point the concentration of the impurities in the blood is high while in the dialysate the concentration is essentially zero. Therefore, the concentration differential at this point is high and consequently the net transfer of impurities from the blood is high. As the two fluids flow co-currently along the membrane, there is a net transfer of impurities from the blood to the dialysate. As the concentration of the impurities in the blood decreases with a corresponding increase in concentration in the dialysate, the concentration differential decreases and the rate of net transfer of impurities diminishes until the concentration in the blood and the dialysate approach each other and the net transfer of impurities is reduced to zero. Although transfer across the membrane continues, it is equal in the two directions so the net transfer is zero and active dialysis ceases. No matter how much longer nor over what surface area the two fluids further remain in contact, there will be no additional purification of the blood. Consequently, with co-current flow, much of the membrane surface area may be wasted. The opposite of this is the desirable counter-current flow relation. In counter-current flow, the blood first contacts the dialysate across the membrane at the point where the dialysate exits, having already flowed the length of the membrane in contact with blood. The dialysate therefore contains a moderate concentration of impurities. However, the concentration of impurities in the blood is high and necessarily higher than the concentration in the dialysate as the dialysate can never attain a higher concentration than the blood with which it has been in contact. Since the dialysate has been in contact with blood which has passed along a portion of the tube and undergone some net transfer, the concentration of impurities in the dialysate is somewhat less than the blood first entering into contact with the membrane. As the blood flows along the membrane, there is a net transfer of impurities to the dialysate consequently lowering the concentration in the blood. However, because the flow is countercurrent, the blood is in contact with dialysate containing a lower and lower concentration of impurities as the blood flows along the membrane. Therefore the concentration in the blood is always greater than the concentration in the dialysate, this concentration differential resulting in a constant net transfer of impurities from the blood to the dialysate. While the concentration in the blood is low at the point where it leaves contact with the dialysate, this is the point where the dialysate first contacts the blood and the concentration of impurities in the dialysate at this point is essentially zero. It is apparent that counter-current flow yields a net transfer of impurities along the entire length of the membrane and is hence more efficient than co-current flow. In a cross-current flow relation the results are somewhat intermediate between co-current and counter-current. A portion of the blood will contact dialysate with essentially zero concentration of impurities while another portion will contact dialysate of a moderate concentration of impurities.

In accordance with the present invention, counter-current flow is effected over a portion of the membrane surface. For sake of clarity in describing the flow relations in the preferred embodiment, tubes formed from a triangularly pleated membrane will be considered so reference can be made to the three "sides" of the tubes. Referring to FIGS. 2 and 3, it can be seen that since the axes of the tubes of adjacent layers are at an angle to each other, the fluid which passes through the triangular tubes contacts the other fluid, which passes between layers and along the tubes of the layer immediately below, through the base of the triangular tube in a cross-current flow relation. Since this is true for all layers and tubes, one-third of the membrane surface area provides for cross-current flow. It can further be seen that the first fluid flows from the distribution manifold 42 over the tubes of odd layer 21 in a direction from tube sheet 11 toward tube sheet 13 while the second fluid flows from distribution manifold 32 through the tubes of odd layer 21 in the same direction from tube sheet 11 toward tube sheet 13. Since this co-current flow occurs on two sides of all the triangular tubes of odd layers, one-third of the membrane surface area provides for co-current flow. However, the first fluid also flows from the distribution manifold 42 over the tubes of even layers 20 in a direction from tube sheet 14 toward tube sheet 12 which is the opposite direction from which the second fluid flows from distribution manifold 32 through the even layer tubes. Since this counter-current flow occurs on two sides of all the triangular tubes of even layers, the remaining one-third of the membrane surface area provides for counter-current flow. Thus it is seen that this preferred embodiment of the present invention provides for relative flow of blood and dialysate which is one-third each cocurrent and cross-current and one-third the desirable countercurrent.

Figure 9:
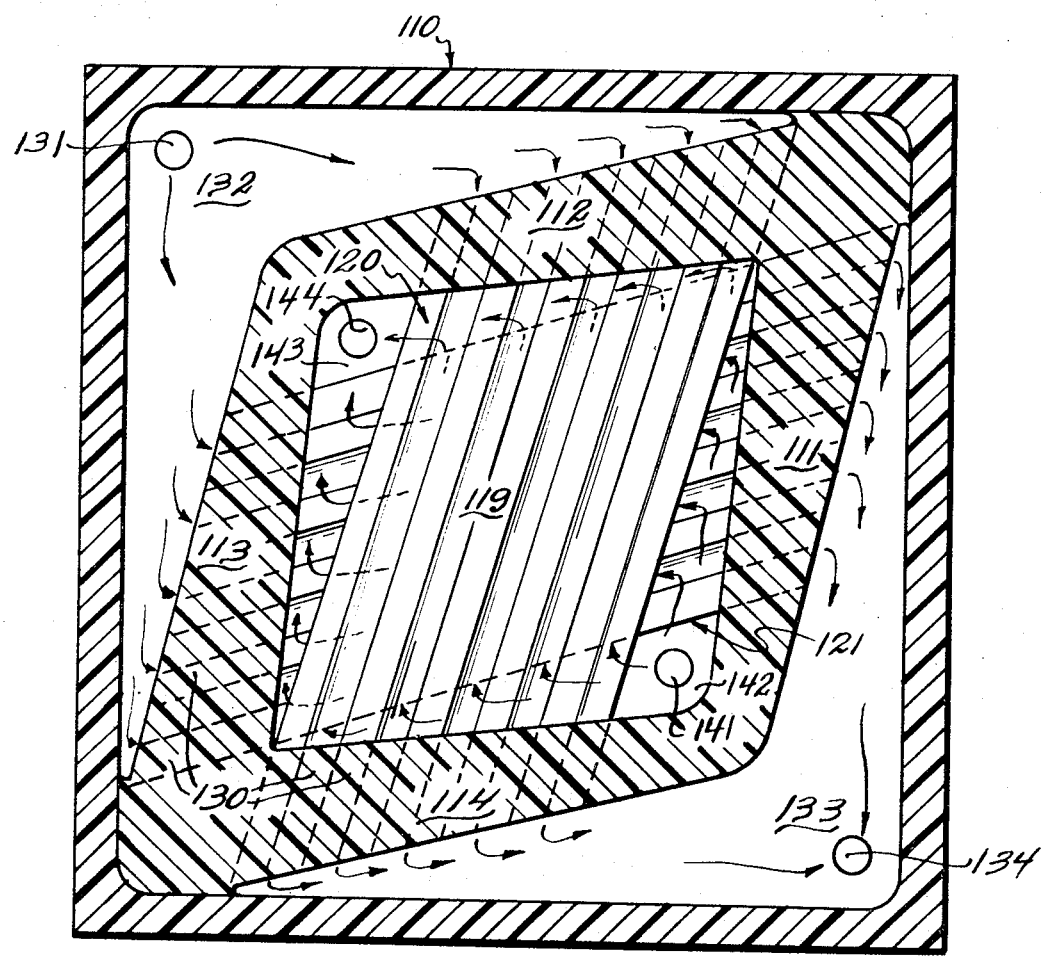
FIG. 9 is a top view with the cover broken away of an alternative embodiment.

With minor modifications in the manifolding, the desirable counter-current flow can be provided for over two-thirds of the membrane surface area with the elimination of the less desirable cocurrent flow. This alternative embodiment is shown in FIG. 9 in which the housing 110 encloses capillary tubes 130 which are arranged in layers in the same manner as described in the description of the preferred embodiment. The ends of the tubes of even layers 120 are sealed together to form tube sheets 112 and 114 and the ends of the tubes of odd layers 121 are sealed together to form tube sheets 111 and 113. One edge of the first even layer tube sheet 112 is sealed at an obtuse angle to an edge of the first odd layer tube sheet 113, the opposite edges of these two tube sheets being sealed to the housing 110. The second even layer tube sheet 114 is likewise sealed to the second odd layer tube sheet 111 at an obtuse angle with the opposite edges of each of these two tube sheets being similarly sealed to the housing 110. The inlet 141 for a first fluid leads to a distribution manifold 142 which is defined by the interior face of tube sheet 114 and the interior face of tube sheet 111 and which fronts on the dialysis chamber 119. The outlet for the first fluid 144 leads from the collection manifold 143 which is defined by the interior face of tube sheet 113 and the interior face of tube sheet 112 and which similarly fronts on the opposite sides of the dialysis chamber 119 from the distribution manifold 142, the manifolds 142 and 143 communicating only through the dialysis chamber. An inlet for a second fluid 131 leads to a distribution manifold 132 which lies between the exterior faces of the tube sheets 112 and 113 and two adjacent sides of the housing 110. The outlet for the second fluid 134 leads from a collection manifold 133 which lies between the exterior faces of tube sheets 111 and 114 and the other two adjacent sides of the housing 110. The second fluid manifolds 132 and 133 communicate only through the tubes 130 and are sealed from the manifolds 142 and 143 as well as the dialysis chamber 119. As can be seen from FIG. 9 in which the arrows indicate the direction of flow, the base of the triangular tubes of all layers will provide for cross-current flow as in the preferred embodiment. However, in this alternative embodiment, both sides of the triangular tubes in all layers will provide for counter-current flow. The first fluid flows from distribution manifold 142 over the tubes of even layers 120 in a direction from tube sheet 114 toward tube sheet 112 while the second fluid flows in the tubes 130 of the even layers 120 in the opposite direction from tube sheet 112 toward tube sheet 114 and at the same time the first fluid flows over the tubes of odd layers 121 in a direction from tube sheet 111 toward tube sheet 113 while the second fluid flows within the tubes of odd layers 121 in the opposite direction from tube sheet 113 toward tube sheet 111. Therefore, counter-current flow is established on two sides of the triangular tubes of all layers or over two-thirds of the membrane surface and co-current flow has been eliminated. While this alternative embodiment provides for more counter-current flow than the first embodiment, it is a more complicated construction and more difficult to produce. Therefore, the first embodiment remains the preferred embodiment.

In addition to providing for countercurrent flow, both the preferred and the alternative embodiments offer many advantages over the prior art. One of these advantages is that the parallelogram shape of the tube layers and the wedge shape of the manifolds results in a uniform blood flow across the cross-sectional area of the dialyzer. Such a uniform blood flow, of course, increases the efficiency of the dialyzer. The wedge-shaped manifolds also produce another extremely important advantage. In the dialysis of blood of a human patient, consideration must be given to the extremely delicate nature of the blood and as many precautions as possible must be taken to avoid damage to the blood cells and clotting of the blood. The blood may be damaged or tend to clot if the passages are not smooth, particularly if the blood must flow over or around sharp corners or protrusions, if the blood is subjected to a rapid acceleration or deceleration or if the blood is subjected to any turbulence as it passes through the dialyzer. Any acceleration or deceleration of the blood is also undesirable because it will necessarily result in a pressure drop across the unit. It is intended that the dialyzer be used without an external blood pump, the patient's heart serving as the only pump for forcing the blood through the dialyzer. Since the acceleration of a fluid requires energy and the pressure drop across the dialyzer puts a heavier burden on the patient's heart, elimination or reduction of any acceleration or deceleration of the blood in the dialyzer is an important consideration. The wedge shape of the manifolds in the present invention is significantly advantageous in view of these considerations. As a given volume of blood flows from the inlet toward the opening for the passage through the dialysis chamber which is furthest from the inlet, a portion of this volume of blood will enter each of the other passages through the dialysis chamber in which the blood passes, correspondingly reducing the volume which continues flowing toward the last opening. If the manifold is of uniform size along its entire length, the cross-sectional area through which the blood flows remains constant. However, the volume which must flow through this area in a unit time is steadily decreasing and the blood correspondingly decelerates. In essence this is the same as a fluid flowing from one pipe into a series of pipes of larger and larger diameter. Each time the fluid passes into the next larger pipe, there is a greater cross-sectional area through which to flow and hence the fluid decelerates. Similarly, where the blood exits from the dialysis chamber and flows toward the outlet, a larger volume must pass through the identical cross-sectional area and hence the blood accelerates. If the blood accelerates or decelerates, there is a possibility of turbulence and this is particularly true at the openings of the passages through the dialysis chamber. The wedge shape of the manifolds of the present invention avoids these problems. As the blood volume continuing to flow toward the last opening decreases, so does the cross-sectional area available for flow in the manifold, and consequently, the blood does not decelerate. The smooth wedge shape also avoids any turbulence and provides a smooth surface for the blood passage. Also by so avoiding a deceleration in the blood, the pressure drop across the dialyzer is reduced, making the dialysis treatment much easier on the patient's heart. The wedge-shaped collection manifold analogously increases in cross-sectional area as the blood volume increases in flowing toward the outlet and hence avoids an acceleration of the blood.

It will be appreciated that there is a change in the cross-sectional area available for blood flow where the blood passes from the inlet tube to the distribution manifold and likewise in passing from the collection manifold to the outlet tube. This change in cross-sectional area available for blood flow will cause an acceleration or deceleration of the blood. As the size of the dialyzer is reduced by use of smaller tubes, the cross-sectional area of the manifold is likewise reduced thereby decreasing the degree of change in the cross-sectional area available for blood flow and consequently reducing the ammount of acceleration. The present invention enables construction of a dialyzer unit of small enough size that the manifolds have a cross-sectional area available for blood flow which more nearly matches the cross-sectional area for the inlet so that the acceleration - deceleration effects are minimized. The size of the inlet is more nearly identical to the manifold than may be apparent from the drawings where a small inlet opening has been indicated for convenience and clarity in the drawings.

The use of tubes formed from a pleated sheet and a flat sheet of the semipermeable membrane in accordance with the present invention also results in advantages over the prior art. The pleats of the pleated sheet act as supports for the fluid passages, eliminating any need for supports either within the tubes or between the different tubes or layers. Consequently, all the supporting material within the dialyzer are functional dialysis membranes. This aspect of the invention has the additional advantage of ease and lower costs in the production of the capillary tubes. A large sheet of the membrane is pleated, the peaks of the pleats of the pleated sheet are coated with an adhesive, and the pleated sheet is contacted with a large flat sheet while the adhesive cures, thereby bonding the large sheets together. This large sheet of tubes can then be cut into the desired shapes and assembled in layers. Although the invention is not so limited, the applicant prefers triangular pleats in forming the tubes in this manner because triangular pleats are much easier to work with than are pleats of other shapes. The triangular pleats are made by folding the sheets of the membrane, the sealant is easily applied to the peaks of the triangles, and the triangular shape leaves most of the area available for dialysis with only a small portion taken up in the bonds. The applicant has found that the triangular tubes take internal pressure quite well but do not stand up quite as well to an external pressure. Therefore, since the blood is always at a slightly higher pressure than the dialysate, when triangular tubes are used in the practice of the present invention, it is preferable to have the blood flow within the tubes. Contrary to this, when round capillaries are used blood flow over the tubes is preferred since the blood does not then see any sharp corners such as the tube ends, and therefore there is less turbulence and less tendency to clot. Another advantage of using tubes constructed in this manner is that the adhesive bond between adjacent tubes in any one layer need not be leaktight since all the tubes of any one layer will contain the same fluid. A leaktight seal is necessary only at the edges of each layer, but this seal is easily reinforced by a second coat of sealant. The prime advantage of using capillary tubes formed in this manner is the compact orderly arrangement which is possible. Prior art use of capillary tubes suffered from the lack of a geometric packing of the capillary tubes and hence the tubes occupied a significantly larger volume with an accompanying waste of space. The pleated sheets have parallel tubes neatly arranged side by side and the layers can be arranged in a compact stack with the resulting close geometric packing of the capillary tubes making a very small dialyzer possible. The effect of so producing the tubes is well illustrated by a consideration of the surface area of the semi-permeable membrane which can be contained in a small volume. Using regenerated cellulose sheets about 1 mil thick, which is often the thickness of membranes used in hemodialysis, the applicant has found pleats 0.030 inch high can very conveniently be formed in the regenerated cellulose sheets, and pleats as small as −.005 inch can be made and successfully bonded to produce the tubes.

When assembled in layers in accordance with the present invention, pleated sheets can be used to yield a compact dialyzer of 85 cm$^3$ volume containing 1.0 M$^2$ of membrane surface area. Such a dialyzer would have external dimensions of 4.4 cm on a side, would contain over 40,000 triangular tubes, and would have a blood priming volume of about 45 cm$^3$.

In addition to the above-cited advantages, this dialyzer has the very important advantage that it can be more easily constructed in large numbers at a relatively low cost and can be constructed from inexpensive materials. The tubes can be formed from pleated sheets as described above both inexpensively and from less expensive sheets rather than preformed tubes. The fact that the tubes are made in large sheets enables easier handling. Sealing can be accomplished with epoxy resin which is inexpensive and the housing can be made of a plastic. Use of these materials in the dialyzer also means the unit can be disposed after use, and in view of the low cost materials and ease of construction, large quantities of these units can be produced to make dialysis treatment available to more people. Also, since the unit is compact but very efficient, dialysis can be conducted without an external blood pump, the patient's heart being sufficient to circulate the blood through the dialyzer. This means the treatment can be received at home and since the unit has a sufficiently low cost, dialysis treatments can be given for a shorter time and more often so that the patient is not in an as weakened condition as is generally the case, eliminating the need for trained medical personnel.

Although the disclosure has been directed primarily toward a dialyzer for the dialysis of human blood, the invention is not limited to such use. In fact, the invention is readily applicable to any use where a dialysis process is to be conducted on two different fluids. Furthermore, the invention is adaptable to other processes where a transfer of a substance from one fluid to a second fluid across a semipermeable membrane is desired and a large surface area in a small volume will increase the efficiency of such transfer. Particularly, the invention can be adapted to operate as an oxygenator for the exchange of oxygen and carbon dioxide across a membrane by use of a silicon rubber membrane and silicon rubber adhesives. The invention could also be adapted for use in the purification of water by a reverse osmosis process.

Thus it is apparent that while the invention has been described in conjunction with specific embodiments thereof, many alternatives, modifications, and variations will be evident to those skilled in the art in light of the foregoing description. Accordingly, it is intended to embrace all such alternatives, modifications, and variations as fall within the spirit and scope of the appended claims.

I claim:

1. An apparatus for the transfer or retention of substances in a first fluid to or from a second fluid through a tube or membrane wall comprising: a plurality of tubes arranged in layers, each such layer consisting of a single row of parallel tubes, the axes of the parallel tubes of one layer being angularly disposed to the axes of the tubes in each adjacent layer and the axes of the tubes in alternate layers being parallel, said tubes being composed of a semipermeable material chosen in accordance with the substances in the first fluid which are desired to be transferred or retained; means for passing one of the two fluids through said tubes; means for passing the other of said fluids between each adjacent pair of said layers over the tubes of each said layer parallel to the plane of the layer; and means for sealing the passages for one fluid from the passages for the other fluid at the tube extremities to prevent intermingling of the two fluids.

2. A dialyzer according to claim 1 wherein the axes of the parallel tubes of one layer are perpendicular to the axes of the tubes in each of the two adjacent layers.

3. A dialyzer according to claim 1 wherein the tubes consist of channels defined between the peaks of a top pleated sheet of a semipermeable membrane and a bottom flat sheet of said semipermeable membrane which has been bonded to said top pleated sheets.

4. An apparatus in accordance with claim 1 for the dialysis of blood wherein said plurality of tubes are contained within a housing and said tubes pass through a dialysis chamber defined within said housing; said means for passing one fluid between the layers over the tubes comprise a first-fluid inlet leading to a first-fluid distribution manifold and a first-fluid outlet leading from a first-fluid collection manifold, said dialysis chamber lying between and connecting said first-fluid distribution and collection manifolds; said means for passing one fluid through said tubes comprise a second-fluid inlet leading to a second-fluid distribution manifold and a second-fluid outlet leading from a second-fluid collection manifold, said second-fluid manifolds being disjunct and sealed from said first-fluid manifolds and said dialysis chamber, and said tubes sealingly connect said second-fluid distribution manifold to said second-fluid collection manifold.

5. The dialyzer of claim 4 wherein the capillary tubes are round capillary fibers, the first fluid is blood, and the second fluid which passes through the dialysis chamber within the tubes is dialysate.

6. The dialyzer of claim 4 wherein the capillary tubes consist of the channels defined between the peaks of a top pleated sheet of a semipermeable membrane and a bottom flat sheet of said semipermeable membrane which has been bonded to said top pleated sheet.

7. The dialyzer of claim 6 wherein the pleats of the top pleated sheet of semipermeable membrane are triangular, the first fluid is dialysate, and the second fluid which passes through the dialysis chamber within the tubes is blood.

8. The dialyzer of claim 6 wherein the two fluids are blood and dialysate, the semipermeable membrane is regenerated cellulose, and the sheets are bonded with an epoxy resin adhesive.

9. A dialyzer comprising: a housing, a plurality of semipermeable membranes in the form of capillary tubes enclosed within said housing, said capillary tubes being arranged in layers, each such layer consisting of a single row of parallel tubes arranged in the form of a parallelogram having sides of unequal length with the axes of the tubes parallel to the longer sides thereof; said layers being stacked such that the planes of all the parallelograms are parallel, alternate parallelograms being identical in size and shape, even layer parallelograms being the mirror image of odd layer parallelograms, the axes of the parallel tubes of one layer being angularly disposed to the axes of the tubes in each adjacent layer and the axes of the tubes in alternate layers being parallel; said layers further being stacked such that straight lines will connect the corresponding vertices of alternate parallelograms; the tubes of even layers being sealed together at the ends thereof to form effectively tube sheets for these capillary tubes, the tubes of odd layers likewise being sealed together at the ends thereof to form effectively tube sheets for these capillary tubes; one edge of a first even layer tube sheet being sealed at an obtuse angle to an edge of a first odd layer tube sheet, the opposite edges of the two tube sheets being sealed to the housing; the second even layer tube sheet being likewise sealed at an obtuse angle to the second odd layer tube sheet, the opposite edges of said tube sheets likewise being sealed to the housing; a dialysis chamber within the housing wherein the tubes of adjacent layers overlap, all tubes passing through said dialysis chamber; a first-fluid inlet leading to a first-fluid distribution manifold, said first-fluid distribution manifold being defined between the housing, the interior face of said first even layer tube sheet, the interior face of said second odd layer tube sheet, and fronting on two sides of the dialysis chamber; a first-fluid outlet leading from a first-fluid collection manifold, said first-fluid collection manifold being defined between the housing, the interior face of said second even layer tube sheet, the interior face of said first odd layer tube sheet, and fronting on the opposite two sides of the dialysis chamber from said first-fluid distribution manifold; said first-fluid distribution and collection manifolds being separated and sealed from each other except as communicating through said dialysis chamber; a second-fluid inlet leading to a second-fluid distribution manifold, said second-fluid distribution manifold being defined between said housing and the exterior faces of said first odd and said first even layer tube sheets; a second-fluid outlet leading from a second-fluid collection manifold, said second-fluid collection manifold being defined between the housing and the exterior faces of said second odd and second even layer tube sheets; said second-fluid manifolds being sealed from said first-fluid manifolds and said dialysis chamber, and communicating with each other through said tubes.

10. The dialyzer of claim 9 wherein the layers are further stacked such that a first straight line will connect one of the vertices of all the parallelograms and a second straight line will connect the opposite vertices of all the parallelograms; the inlet tube sheet is formed by those sides of the parallelograms which meet said first straight line; and the outlet tube sheet is formed by those sides of the parallelograms which meet said second straight line.

11. The dialyzer of claim 9 wherein the semipermeable membranes are regenerated cellulose and wherein the tubes are sealed together at the ends thereof with an epoxy resin and wherein the seals between the various elements are effected with an epoxy resin.

12. The dialyzer of claim 11 wherein the capillary tubes are round capillary fibers, the first fluid is blood, and the second fluid which passes through the dialysis chamber within the tubes is dialysate.

13. The dialyzer of claim 9 wherein the capillary tubes consist of the channels defined between the peaks of a top pleated sheet of a semipermeable membrane and a bottom flat sheet of said semipermeable membrane which has been bonded to said top pleated sheet.

14. The dialyzer of claim 11 wherein the capillary tubes consist of the channels defined between the peaks Of a top pleated sheet of regenerated cellulose and a bottom flat sheet of regenerated cellulose which has been bonded to said top pleated sheet with an epoxy resin adhesive and wherein the two fluids are blood and dialysate.

15. The hemodialyzer of claim 14 wherein the pleats of the top pleated sheet are triangular, the first fluid is the dialysate, and the second fluid which passes through the dialysis chamber within the tubes is the blood.

16. The hemodialyzer of claim 15 wherein the sheets of regenerated cellulose are about 0.001 inch thick and the pleats of the top pleated sheet are from 0.030 inch to 0.005 inch high.

17. The dialyzer of claim 9 wherein the housing is a rectangular parallelepiped which is square in cross section; the first-fluid inlet is at one corner of one square end of said housing; the first-fluid distribution manifold is located along the rectangular edge of the housing originating at the first-fluid inlet corner; the first-fluid outlet is at the opposite corner and on the opposite end of the housing from said first-fluid inlet; the first-fluid collection manifold is located along the rectangular edge of said housing opposite said first-fluid distribution manifold; the second-fluid inlet is located on the square end of said housing at a corner adjacent said first-fluid inlet; the second-fluid distribution manifold is located along two adjacent rectangular sides of said housing which meet at the second-fluid inlet corner and between said first-fluid distribution and collection manifolds; the second-fluid collection manifold is located along the opposite two adjacent sides of said housing and between said first-fluid distribution and collection manifolds; the second-fluid outlet is located at the opposite corner and on the opposite end of the housing from said second-fluid inlet.

* * * * *